Jan. 24, 1967  R. M. BUCK ETAL  3,300,617

METHOD FOR METALS JOINING

Filed April 12, 1963

United States Patent Office 3,300,617
Patented Jan. 24, 1967

3,300,617
METHOD FOR METALS JOINING
Richard M. Buck, Bloomfield, and Isaac S. Goodman, Livingston, N.J., assignors to Westinghouse Electric Corporation, Pittsburgh, Pa., a corporation of Pennsylvania
Filed Apr. 12, 1963, Ser. No. 272,677
5 Claims. (Cl. 219—117)

This invention relates to metals joining and has particular relationship to the art of joining metallurgically highly refractory metals and particularly such refractory metals as tungsten and molybdenum. Typically, the problem of making such joints has arisen in the lamp and electron-tube industry. For example, in the making of quartz infrared lamps, it is necessary to produce a metallurgical connection or seal between a tungsten coil and an electrode of tungsten. A like problem arises in the making of mercury vapor lamps in which it is necessary to join a molybdenum or ribbon to a molybdenum hairpin heater, and then join a tungsten wire to the foil.

It is an object of this invention to provide a low-cost method, particularly for use in the lamp making industry, but also having general use, for joining such metals as molybdenum and tungsten by metallurgical bonds.

Another object of this invention is to provide such a method which shall lend itself to use in automatic lamp and tube making apparatus.

In accordance with the teachings of the prior art, attempts have been made to produce metallurgical bonds between tungsten or molybdenum parts or between a tungsten part and a molybdenum part by coating one of the parts with a thin film or by providing the parts with an interlayer taking the form of a foil or thin film or powder and then effecting the joint through the film or interlayer. The metallurgical bond or seal is then achieved by transmitting adequate current through the joint to produce a spot or seam weld through the interface, fusing the interface into the two adjacent parts.

This prior art practice has been found to lead to unreliable seals in which the welds frequently fail. The failure has been ascribed to the reaction of the interlayer with such atmospheric gases as nitrogen or oxygen and with any hydrogen which happens to be present. Attempts have been made to overcome this difficulty by supplying a protective gas during the welding operation, but this had led to complex apparatus and has proved unsatisfactory.

In addition, it is desirable that the process of sealing the parts lend itself to automatic production of lamps. The provision of the parts to be joined with an interlayer of foil or film or powder does not lend itself to automatic production.

It is then an object of this invention to provide a method of producing a metallurgical bond or seal between refractory materials which shall not require that a protective shielding gas be supplied during the joining operation and which shall readily lend itself to automatic production of lamps or tubes.

In accordance with this invention, a metallurgical bond between two highly reactive parts is effected by coating at least one of the parts in the region where it is to be joined with a slurry of a material having a higher electrical resistance and a lower melting point (temperature) than the material of the parts. While it is an important feature of this invention that the material have both the higher resistance and the lower melting temperature, a material having either of these properties may be used in accordance with the broader aspects of this invention. Of the two, the lower melting temperature is most important. The higher resistance alone would concentrate the heat developed by the IR drop of the current at the joint and melt the slurry material together with the adjacent material of lower melting temperature. Likewise, because there is a joint, heat would be concentrated to melt the lower melting material even if its electrical resistance were lower than that of the material being bonded.

The parts are, in accordance with this invention, held with the slurry between them and the welding current is transmitted through the parts and through the slurry. The material is fused producing the metallurgical bond. The slurry is composed of a powder of the material in a vaporizable liquid. The liquid should be in sufficient quantity in the slurry to impart to the particles of the powder a wetting action so that the particles adhere to the part to be joined firmly and the joining operation may be carried out with facility. It is also necessary that the powder be maintained in suspension in the slurry so that adequate powder is available for the joining operation. During the fusing of the material, the liquid is vaporized providing a protective atmosphere for the weld so that a sound joint is produced.

The slurry lends itself readily to automatic manufacturing operations. The liquid in the slurry is set so that the slurry may be readily applied by an automatically operating applicator to the parts to be joined.

The slurry constitutes an important component of this invention and it is an ancillary object of this invention in its specific aspects to provide a suitable slurry.

In accordance with this invention in one of its specific but highly important aspects, the slurry is made up of tantalum powder in a thermally decomposable binder of nitrocellulose or cellulose acetate dissolved in an organic liquid vehicle such as amyl acetate or ethylene glycol. In a typical slurry, there are 73.6 grams of tantalum powder and 21.3 grams of binder comprising nitrocellulose dissolved in amyl acetate. There is about 2.7% nitrocellulose in the binder and the remainder is amyl acetate. The ratio of the binder to the powder may vary over a wide range. It is only necessary that this ratio be such as to impart the necessary wetting action to the powder and that the slurry produced lend itself to use in automatic apparatus.

In the practice of this invention, metallurgical bonds between parts of tungsten or molybdenum or tungsten and molybdenum have been made which have been found to be highly satisfactory. Microstudies of sections of the joints have established the substantial absence of the binder and relatively uniform diffusion of the powder in the base metal (tungsten or molybdenum).

In accordance with the broader aspects of this invention, it has been found that other materials may be used. Slurries of palladium and niobium powders in nitrocellulose or cellulose acetate binders have proved satisfactory. Since zirconium is very similar to tantalum, palladium and niobium, zirconium powders combined with the same binders are also believed to be satisfactory.

Generally, the powder materials which have been used are the tantalum, palladium, niobium and zirconium and also alloys of these elements.

The novel features considered characteristic of this invention are disclosed generally above. For a better understanding of this invention, both as to its organization and as to its method of operation, together with additional objetcs and advantages thereof, reference is made to the following description of apparatus for practicing the invention taken in connection with the accompanying drawing, in which.

Figure 1:
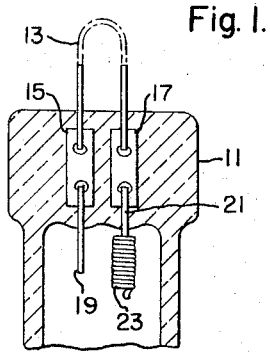
FIGURE 1 is a view in section showing a portion of a lamp to which this invention is applied.
Figure 3:
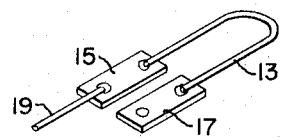
FIG. 3 is a view in perspective showing the parts produced with the apparatus shown in FIG. 2.
Figure 5:
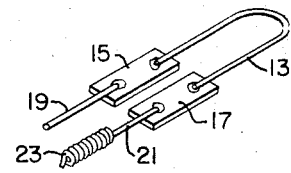
FIG. 5 is a view in perspective showing a completed subassembly produced by the apparatus shown in FIG. 2 and an additional like apparatus.

The lamp part shown in FIG. 1 incldues a press 11 in which a lamp subassembly is sealed. This subassembly includes a hairpin 13 of molybdenum. Each of the ends of the hairpin 13 is joined metallurgically to molybdenum foil or ribbon 15 or 17. One of these foils 15 is joined to a tungsten wire 19, the other foil 17 is joined to a tungsten wire 21 to which a coil 23 has been hot clamped. The foils 15 and 17 and the end of the hairpin 13 and the tungsten wires 19 and 21 are sealed into the press 11. The subassembly of the lamp part shown in FIG. 1 including all but the coil 23 and its tungsten wire 21 which is shown in FIG. 3 is made with the apparatus shown in FIG. 2. The subassembly shown in FIG. 3 is completed and given the form shown in FIG. 5 by an additional machine.

Figure 2:
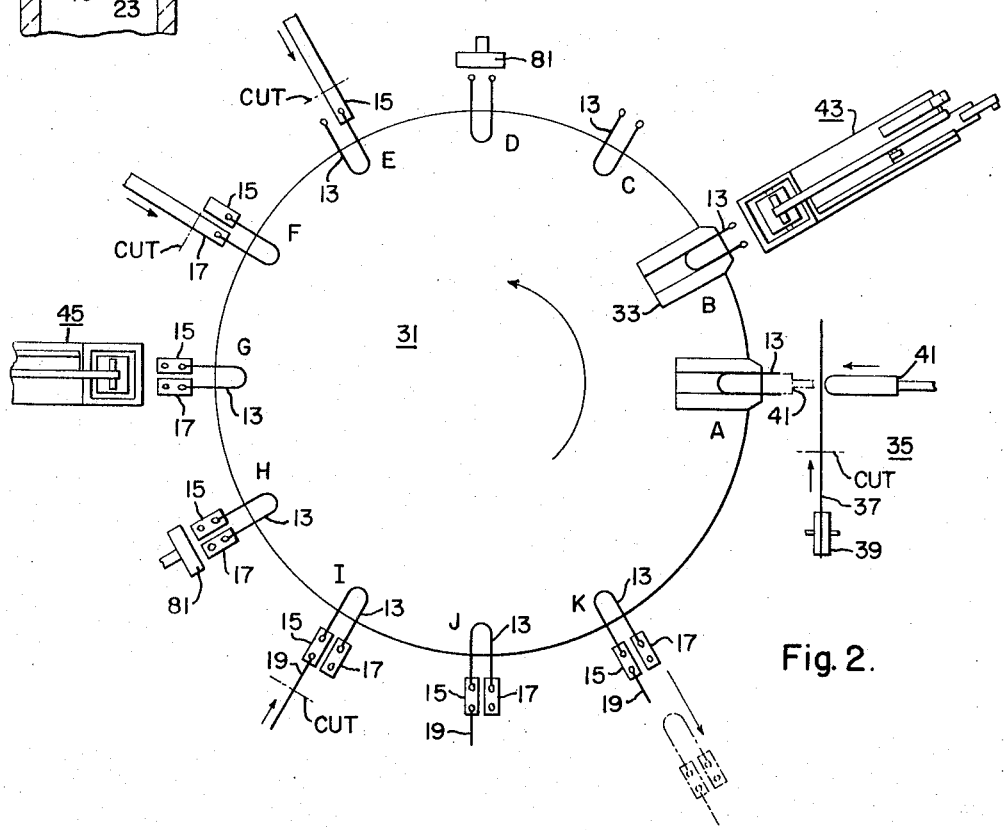
FIG. 2 is a diagrammatic view illustrating the practice of this invention in the automatic production of parts for lamps.
Figure 4:
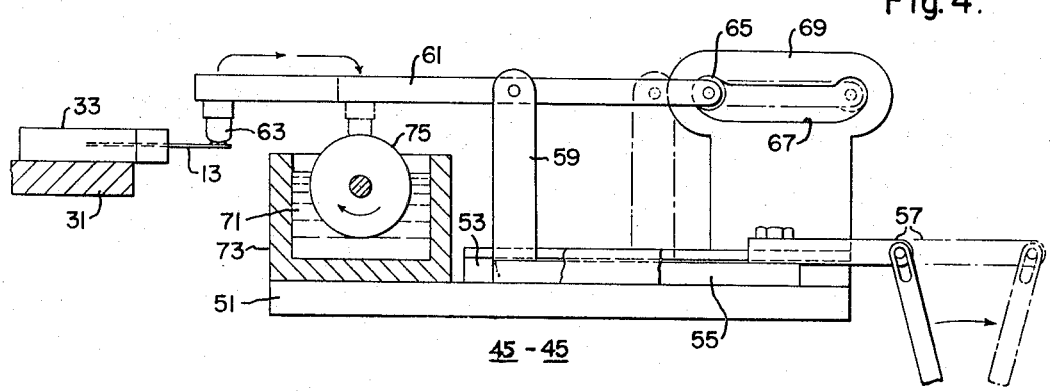
FIG. 4 is a view partly diagrammatic and partly in section showing slurry-applicator apparatus used in the practice of this invention.

The apparatus shown in FIG. 2 includes a turret 31 which may be indexed in the usual manner and which includes a plurality of holding brackets 33 (only two shown) in positions A through K spaced around its periphery. Each bracket is indexed through positions A through K in a counter-clockwise direction as viewed towards the drawing.

The apparatus shown in FIG. 2 also includes a mechanism 35 for injecting a hairpin of molybdenum into the brocket 33 at position A. This mechanism operates on a molybdenum wire 37 which may be derived from a reel 39. The mechanism includes a plunger 41 which bends the wire into a hairpin 13 and injects it into the holding bracket 33 while the turret is at rest and a cutter (not shown) for severing the hairpin from the remainder of the wire 37. The wire 37 is continuously advanced in synchronism with the turret 31 and hairpins are continuously injected into the brackets 33 while they are at rest.

A slurry-applicator unit 43 is disposed to apply slurry to the ends of the hairpin 13 when the hairpin has been indexed to position B and is at rest in this position. Another applicator unit 45 is disposed at position G.

This slurry-applicator unit includes a base or bracket 51 which is provided with suitable tracks 53 between which a slider 55 is reciprocated. The slider 55 may be driven through a bell crank 57 which is cam operated.

At its end remote from the drive 57, the slider 55 carries an arm 59 at the upper end of which a lever 61 is pivotally supported. This lever carries an applicator tip 63 at one end and a cam follower 65 cooperative with a slot cam 67 in a plate 69 secured to the base or bracket 51 at the other end. The applicator tip 63 may be composed of an absorbent material which is adapted to receive the slurry and apply it to the ends of the hairpin 13. The applicator tip should be of sufficient width to extend across the ends of the hairpin 13 and apply the slurry to both ends. Alternatively, the lever 61 may be formed at the applicator end with a fork having separate tips.

Slurry 71 is provided in a tank 73 of ceramic or other material mounted on the base 51 in which a wheel 75, which may also be composed of a ceramic, is rotatable. The wheel rotates continuously in a clockwise direction as viewed looking towards the drawing and its rotation is usually adequate to maintain the slurry stirred so that the solid is uniformly suspended in the liquid. If the stirring of the wheel is inadequate, additional stirrers may be provided.

The applicator 43-45 is shown in the forward position in which the slurry 71 is applied to the ends of the hairpin 13. The cam-driven bell crank 57 reverses the movement of the slider at this point so that the applicator lever 61 is moved to the right. As the slider moves away from the hairpin 13, the cam follower 65 rides downwardly in the cam 67 raising the applicator tip above the wheel 75 in the applicator supply tank 73. The movement continues until the slider 55 reaches the end of its reverse stroke. At this point, the cam follower 65 is raised vertically and the applicator tip 63 is lowered onto the rotating wheel 75 so that slurry 71 is applied to the tip.

The slider 55 then starts its forward stroke. During this stroke, the cam follower 65 is lowered by the cam 67 raising the applicator tip 63 above the wheel 75. The forward movement continues until the end of the forward stroke at which point the cam follower 65 is raised dropping the applicator tip 63 on the hairpin 13 and applying the slurry. The slider is reciprocated in synchronism with the movement of the turret 31 and the applicator tip 63 preferably arrives at the position in which it applies the slurry when the turret 31 is at rest with the ends of the hairpin 13 in position to receive the slurry.

In the use of the apparatus shown in FIG. 2, the slurry in the container is set so that it has the necessary wetting action and consistency for welding. Usually the slurry is adjusted at the start of each day's operation. The attendant in charge of the apparatus starts the stirring of the slurry 71 in its container 73 and applies a trial layer of the slurry to one of the parts to be joined. By observing this application of the slurry, the attendant can determine if the viscosity of the slurry is proper. If the slurry is too viscous, the operator adds the liquid; if the slurry is insufficiently viscous, the operator adds solid material. The operation of the apparatus is then started.

At the starting station A, a molybdenum hairpin is injected into the holding bracket 33 with its ends extending radially from the turret 31. At the next station B, the applicator unit 41 applies slurry to both ends. While the slurry is being applied to the ends of the hairpin 13 at station B, a new hairpin 13 is being injected into the bracket 33 at station A. At the fourth station D, the slurry is dried by drying means 81. At the fifth station E, a molybdenum foil derived from a reel or other storage apparatus (not shown) is brought into contact with one of the hairpin ends in the region where the slurry has been deposited, and welding current is transmitted through the foil, the slurry and the hairpin at the joint. The foil is then spot welded to the end of the hairpin, and after the welding is completed, the foil is severed leaving a small strip of ribbon 15. At the sixth station F, another strip of foil 17 is welded to the other hairpin end. At the seventh station G, the second slurry applicator unit 45 applies slurry to both foils 15 and 17. The slurry may be dried at an eighth station H and at a ninth station I the region of the slurry on one of the foils 15 is brought into contact with the end of tungsten wire derived from a reel (not shown) and current is transmitted to spot weld the tungsten wire to the molybdenum foil. The foil-and-tungsten-wire assembly is in the form shown in FIG. 3 as is discharged at a twelfth station K. Typically, the discharge apparatus may take the form shown in application 173,659, filed February 16, 1962 to Richard F. Hasell and owned by the present assignee.

The subassembly discharged may be transferred to a second turret (not shown) where a process analogous to the above-described process is repeated to weld the tungsten wire 21 carrying the coil 23 to the other foil 17. The subassembly then has the form shown in FIG. 5 and is sealed into the press 11. The resulting structure is shown in FIG. 1.

While a preferred embodiment of this invention has been disclosed herein, many modifications thereof are feasible. This invention then is not to be restricted except insofar as is necessitated by the spirit of the prior art.

We claim as our invention:

1. The method of metallurgically bonding a first tungsten or molybdenum part to a second tungsten or molybdenum part, which method comprises:

(a) depositing on at least one of said parts, in the region where it is to be bonded to said other part, a slurry of finely divided bonding metal suspended in a vehicle, the finely divided bonding metal of said slurry being one or more of tantalum, palladium, niobium and zirconium, the vehicle of said slurry being a volatile organic liquid which wets both said finely divided bonding metal and said part to which it is applied, and said slurry also including a thermally decomposable organic binder dissolved in said vehicle;

(b) drying said deposited slurry to leave on said one part residual slurry which includes said finely divided bonding metal and said binder;

(c) bringing said other part to be joined into contact with said one part in the region where it is to be welded with the residual slurry between said parts; and (d) passing sufficient electrical current through said parts and said residual slurry to melt said finely divided bonding metal, decompose and volatilize said binder, and bond said parts together.

2. The method as specified in claim 1, wherein said organic vehicle is amyl acetate or ethylene glycol, and said binder is nitrocellulose or cellulose acetate.

3. The method as specified in claim 1, wherein said bonding metal is tantalum.

4. The method as specified in claim 1, wherein one of said parts is formed as a wire and the other of said parts is formed as a ribbon.

5. The method as specified in claim 4, wherein said wire part has the configuration of a hairpin-shaped member and is retained in a bracket with the ends of the hairpin extending from the bracket, said slurry is deposited on the ends of said hairpin, and said ribbon part is held against an end of said hairpin during bonding.

References Cited by the Examiner
UNITED STATES PATENTS

| | | | |
|---|---|---|---|
| 1,942,364 | 4/1926 | Rood | 219—146 |
| 2,005,256 | 6/1935 | Eithel et al. | 219—117 |
| 2,481,626 | 9/1949 | Sehryber | 219—92 |
| 2,497,496 | 2/1950 | Gooskens et al. | 117—227 X |
| 2,544,000 | 3/1951 | Wasserman | 117—204 |
| 2,623,975 | 12/1952 | Watrous | 219—91 |
| 2,726,308 | 12/1955 | Cinamon | 219—92 X |
| 2,809,275 | 10/1957 | Van Der Willigen | 219—99 |
| 2,830,169 | 4/1958 | Medicus | 219—92 |
| 2,914,435 | 11/1959 | Wasserman et al. | 148—24 |
| 2,955,193 | 10/1960 | Johnson et al. | 148—24 |
| 3,102,190 | 8/1963 | Chapleur et al. | 219—92 X |

RICHARD M. WOOD, *Primary Examiner.*

B. A. STEIN, *Assistant Examiner.*